United States Patent Office 3,103,491
Patented Sept. 10, 1963

3,103,491
STABILIZED GREASE COMPOSITION
John H. Wright, Waterford, N.Y., assignor to General Electric Company, a corporation of New York
No Drawing. Filed Oct. 31, 1960, Ser. No. 65,899
13 Claims. (Cl. 252—28)

This invention relates to improved silicone grease compositions. More particularly, the present invention is concerned with silicone grease compositions of improved thermal stability and improved electrical properties, to treated thickening agents used in these grease compositions and to the methods of preparing these grease compositions and thickening agents.

Silicone greases and grease compositions are well known in the art and have been used as lubricants, dielectric compounds, sealing compounds, and high vacuum greases. These silicone greases have been particularly valuable because of their high degree of heat resistance, their water repellency, their low temperature viscosity characteristics and their dielectric properties. These grease compositions have generally comprised a silicone oil and a finely divided silica thickener. A typical prior art silicone grease is shown in Patent 2,428,608—Bass.

While these silicone oil-silica thickened greases have been used extensively, it has been found that the greases have certain defects. The most important of these defects has been in the stability of the greases. When a silica thickened silicone grease is stored at room temperature and subjected to mechanical work at intervals during its life, the grease gradually loses its structure and becomes fluid. A number of additives have been suggested to stabilize these greases at room temperature. While these additives have been more or less surccessful in stabilizing these greases at room temperature, they have failed to stabilize these greases at elevated temperatures. That is, when a "room temperature stabilized" grease was worked after storage at elevated temperatures, such as temperatures of from 150 to 250° C., it was found that the working destroyed the grease structure, and turned the grease into a fluid.

The stability of the grease is measured in terms of its penetration after mechanical working of the grease after storage and a full definition of a standard test is found in ASTM Test No. D217-52T.

Another defect in prior art silicone greases have been in their electrical properties. Thus, the power factor, dielectric constant and volume resistivity of these greases have not been as high as desired.

The present invention is based on my discovery of silicone grease compositions of improved stability at elevated temperatures and improved electrical properties which comprise (1) a silicone oil, (2) a finely divided silica as a thickening agent and (3) a minor amount of a stabilizer comprising a boron compound selected from the class consisting of boric acid, trimethoxyboroxine and a trialkylborate in which the alkyl radicals contain from 1 to 5 carbon atoms. These grease compositions are prepared by either blending the various ingredients in a conventional fashion or by pre-treating the finely divided silica with the boron compound and then blending the treated silica and the silicone oil.

In common with the prior art silicone greases, the stabilized silicone grease of the present invention comprises a major portion of a silicone oil. This silicone oil, or organopolysiloxane fluid, can be any of the conventional organopolysiloxane fluids which are well known in the art. Many of these conventional silicone oils are described in Patents 2,469,888—Patnode, 2,469,890—Patnode and Patent 2,689,859—Burkhard. A particularly preferred group of organopolysiloxane fluids includes those having the average formula:

(1) $$R_nSiO_{\frac{4-n}{2}}$$

where R represents a member selected from the class consisting of monovalent hydrocarbon radicals and halogenated monovalent hydrocarbon radicals and $n$ has a value of from 2.004 to 2.4. Among the specific radicals represented by R in Formula 1 are alkyl radicals, e.g., methyl, ethyl, propyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, etc. radicals; cycloaliphatic radicals, e.g., cyclohexyl, cycloheptyl, cyclohexenyl, etc. radicals; halogenated aliphatic radicals, e.g., chloromethyl, trifluoromethyl, chlorovinyl, etc. radicals; haloaryl radicals, e.g., chlorophenyl, dichlorophenyl, tetrachlorophenyl, dibromophenyl, chloronaphthyl, etc. radicals.

Preferably, the radicals represented by R in Formula 1 are monovalent hydrocarbon radicals free of olefinic unsaturation, with the preferred specific radical being methyl. Where the radicals represented by R in Formula 1 include radicals other than methyl, it is preferred that at least 50% of the organic radicals attached to silicon are methyl radicals. It should be understood that the organopolysilicoxanes of Formula 1 include both linear triorganosilyl chain-stopped organopolysiloxanes as well as triorganosilyl chain-stopped branched-chain organopolysiloxanes.

Although any organopolysiloxane fluid within the scope of Formula 1 is applicable in the preparation of the stabilized grease compositions of the present invention, it is preferred that the organopolysiloxane fluid have a viscosity from about 10 centistokes to 100,000 centistokes when measured at 25° C.

It should be understood that the organopolysiloxane fluids of Formula 1 can include siloxane units of varied type and formulation, such as triorganosiloxane units and diorganosiloxane units alone or in combination with monoorganosiloxane units. The only requirement is that the ratio of the various siloxane units employed be such that the average composition of the copolymeric fluid is within the scope of Formula 1. It should also be understood that these various siloxane units can contain the same or different silicon-bonded organic radicals. For example, the siloxane units employed in preparing the fluid of Formula 1 can contain trimethylsiloxane units, methylphenylsiloxane units, diphenylsiloxane units, and triphenylsiloxane units, methylsiloxane units, and phenylsiloxane units. It should be also understood that the stabilized grease compositions of the present invention can contain more than one organopolysiloxane fluid within the scope of Formula 1. Thus, two or more organopolysiloxane fluids within the scope of Formula 1 can be blended to form the silicone oil which forms the major component of my stabilized grease compositions.

The finely divided silicas employed as a thickening agent in preparing the grease compositions of the present invention are also well known in the art. In general, these silicas are sufficiently fine so as to have a relatively high surface area per unit volume. In general, these finely divided silicas have a surface of at least one square meter per gram. Most preferable are those having a surface area between about 4 and 400 or more square meters per gram.

The preparation of high surface area silicas and the chemical changes that occur during the preparation of these silicas are described in "Natural and Synthetic High Polymers" by K. M. Meyer, page 85 (1942), and in Hurd "Chemical Reviews," volume 22, No. 3, page 403 (1938). The silicas useful for my invention are those having numerous pores or voids therein. These porous materials having exposed surfaces allow the silicone oil and the boron compound to penetrate the surfaces of the pore walls to provide uniform materials. Included among the silicas useful in the practice of my invention are precipitated silica, silica aerogel and fumed silica.

A typical method of preparing precipitated silica comprises precipitating silica by the addition of sulfuric acid to a sodium silicate solution and working the gel relatively free of salts with water. If the water is evaporated from the gel in this state, the latter shrinks considerably in volume due to the force exerted on the solid phase of the gel by the surface tension of the liquid as it recedes in the pores of the material. This results in a precipitated silica, which is also called a xerogel. A typical precipitated silica is the material sold by the Columbia Southern Chemical Company under the name Hi-Sil X-303.

In contrast to precipitated silicas or xerogels, aerogels are composed of the original solid phase gel in substantially the same condition as while filled with the swelling liquid. Aerogels are conveniently made by raising the gel to the critical temperature of the liquid contained therein while maintaining the pressure on the system sufficiently high to insure that the liquid phase will remain until the critical temperature is reached. At this point, the liquid will be converted into the gaseous state without the formation of menisci at the gas-liquid interface. The degree of porosity may be controlled to a large degree by controlling the concentration of silica in the gel as it is precipitated. These aerogels may be used in this condition or may be ground to a finer state of subdivision. Examples of a commercial aerogel are Santocel C and Santocel CS, which are marketed by Monsanto Chemical Company and which have a specific surface area of 100 to 200 square meters per gram.

In addition to the porous precipitated silica described above, finely divided, less porous silicas can also be used. These finely divided silicas are usually prepared by burning various siliceous compounds. For example, fumed silica can be prepared by burning silicon-tetrachloride, an example of which is commercially known as Cab-O-Sil or Aerosil, which is sold by the Godfrey L. Cabot Company. This silica has a surface area of about 200 square meters per gram. Another finely divided silica can be prepared by burning silicate esters, as described in U.S. Patent 2,399,687—McNabb. Still another finely divided powder is that described in "Chemical Engineering," 54, page 177 (1947), which silica has a specific surface area of about 240 square meters per gram.

While all of the finely divided silicas described above and others well known in the art are operable in the preparation of the stabilized silicone grease compositions of the present invention, it should be understood that all of these grease compositions are not equivalent in the preparation of grease composition. For example, the silica aerogels described above are much preferred as thickening agents in the grease compositions of the present invention since the silica aerogel provides a finer texture and a more stable grease composition than is provided when, for example, fumed silica or precipitated silica is employed.

The amount of finely divided silica employed in the grease compositions is sufficient to provide the desired consistency in the grease. The amount of a particular silica thickening agent which is required to provide the desired penetration can be readily determined by a person skilled in the art. In general, however, the silica filler is employed in an amount equal to from about 5 to 17 parts by weight per 100 parts by weight of the silicone oil.

The boron compounds employed in the practice of the present invention are all well known to the art and include boric acid, trimethoxyboroxine, and trialkylborates in which the alkyl groups contain from 1 to 5 carbon atoms. The preferred boron compound employed in the practice of the present invention is trimethoxyboroxine which is also known as methylmetaborate and has the formula:

(2) 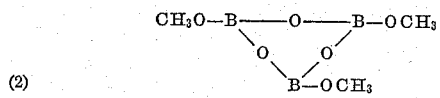

Included among the trialkylborates which are employed in the practice of the present invention can be mentioned, for example, trimethylborate, triethylborate, tributylborate, triamylborate, methyldiamylborate and other trialkyl borates having the formula:

(3) $(R'O)_3B$ where $R'$ represents an alkyl radical having from 1 to 5 carbon atoms.

The amount of the boron compound which can be employed as a mechanical stabilizing additive in the stabilized grease compositions of the present invention can vary within wide limits so long as the boron compound is present in the composition in minor amounts with respect to both the amount of silicone oil and the amount of silica thickening agent in the composition. In general, it is preferred to have the boron compound present in sufficient amount to provide at least 0.001 part of boron per 100 parts by weight of the silicone oil. While there is no upper limit to the amount of the boron compound which can be employed in the grease compositions, no advantage is found in the use of more than an amount sufficient to provide about 1.0 part boron per 100 parts of the silicone oil. When more than this amount of boron compound is employed, it is found that there is some evaporation or volatilization of the boron compound from the grease composition when the composition is subject to elevated temperatures. While this evaporation does not affect the utility of the grease composition, it is undesirable from an economic viewpoint and of course is undesirable when the stabilized grease compositions are to be employed in closed systems, particularly in evacuated closed systems.

The stabilized grease compositions of the present invention can be prepared in a conventional fashion by merely blending the silicone oil, the finely divided silica thickening agent and the boron compound in any suitable fashion. One conventional method for blending these materials is to mix the materials and then add the mixture to a standard three-roll paint mill to blend the ingredients into a grease.

As soon as this blending operation is completed, the grease composition is ready for use without further treatment. However, it has been found that the mechanical stability of the grease is even further improved if the grease is heated for a short time. The exact way in which this heating step accomplishes the improved properties is not known since there is no indication of any change in the composition of the material or in any reaction between or interaction between the various components of the mixture. This heating step can be accomplished by heating the grease at a temperature of from about 100 to 250° C. for times on the order of 1 to 6 or more hours. Preferably, the heat treatment is accomplished at a temperature of about 150 to 200° C. for about 3 hours.

An alternate method of preparing the grease compositions of the present invention is to pre-treat the silica thickening agent with the boron compound and subsequently blend the thus treated filler with the silicone oil in a conventional paint mill to provide the grease compositions of the present invention. Where the silica thickening agent is pre-treated with the boron compound, the pre-treatment is effected by merely mixing the boron compound and the finely divided silica in the desired proportions at room temperature. The proportions are selected so that the desired ratio of silica and boron compound is present in the final grease when the treated filler is added to the silicone oil.

As an alternative and preferred method of forming the treated filler, the filler is first mixed with the boron compound and then the mixture is heated for a short time at an elevated temperature. The temperatures used in the heat treatment of the silica-boron compound mixture are the same as those used in heat treating the final grease, i.e., a temperature of from about 100 to 250° C. for a time of from about 1 to 6 hours or more with the preferable heating schedule being about 150 to 200° C. for a time of about 3 hours. After this heat treatment, the treated silica is then blended into the silicone oil by any suitable means such as by means of a conventional three-roll paint mill. The product prepared from the pre-treated and heat treated filler is again superior to the product obtained when the filler, the boron compound and the silicone oil are merely blended at room temperature with no subsequent heat treatment.

While the foregoing description has been directed to the preparation of silicone greases containing only the silicone oil, the boron compound and the finely divided silica filler, it should be understood that these compositions can be further modified by the addition of fillers other than those discussed above, and by the addition of stabilizers other than the boron compound stabilizers. Thus, when water leach resistance is desired in the grease composition, it has been found desirable to replace some of the finely divided silica thickener with a silica thickener which has been pre-treated with octamethylcyclotetrasiloxane. The use of octamethylcyclotetrasiloxane-treated silica in silicone grease compositions is described and claimed in my copending application Serial No. 65,898, now Patent 3,037,933, filed concurrently herewith and assigned to the same assignee as the present invention. This pre-treatment is accomplished by heating the silica and the octamethylcyclotetrasiloxane at a temperature of from about 150° C. to 350° C. to effect diffusion of the octamethylcyclotetrasiloxane through the silica and to remove at least some of the octamethylcyclotetrasiloxane, leaving behind a finely divided silica containing an adsorbed film of octamethylcyclotetrasiloxane. This method of treating finely divided silica is described and claimed in Patent 2,938,009—Lucas. In general, the octamethylcyclotetrasiloxane is added to the finely divided silica in an amount equal to from about 5 to 55% by weight octamethylcyclotetrasiloxane based on the weight of the silica being treated. When this octamethylcyclotetrasiloxane-treated silica is employed in the grease compositions of the present invention, this treated silica forms a minor amount of the total thickening agent present in the composition. Thus, the use of octamethylcyclotetrasiloxane-treated silica in the amount of from about 10 to 40% by weight, based on the weight of the total silica content, produces stable greases which exhibit water leach resistance.

Additional stabilizers which are useful in the preparation of the compositions of the present invention include pentaerythritol and many of the relatively high molecular weight polyalkylene glycols and glycol ethers which can be described generically as having the formula:

(4)     $R'O(C_aH_{2a}O)_x(C_bH_{2b}O)_yH$ where $R'$ is a member selected from the class consisting of hydrogen and lower alkyl radicals containing from 1 to 7 carbon atoms, $a$ and $b$ are integers equal to from 1 to 4, inclusive, $x$ is an integer equal to from about 4 to 50 or more and preferably from 5 to 20, inclusive, and $y$ is a whole number equal to from 0 to about 50. These compounds can be prepared, for example, by forming polyalkylene glycols of ethylene glycol, propylene glycol or butylene glycol. These polyalkylene glycols are in turn reacted with a monohydric saturated aliphatic alcohol containing from 1 to 7 carbon atoms to form the monoether. A composition containing two different alkylene oxide groups can be prepared, for example, by reacting a polypropylene glycol with ethylene oxide in the presence of borontrifluoride. This mixed polyalkylene glycol, if desired, can then be reacted with an alkanol such as butanol to form the monobutoxyether of the mixed polyalkylene glycol. A number of these polyalkylene oxide materials are commercially available including the materials sold under the tradename "Ucon" by Union Carbide Corporation, and the materials sold under the name of "Pluronic" by the Wyandotte Chemicals Corporation. When these stabilizers are added to the compositions of the present invention, they are present in an amount up to about 3 parts by weight per 100 parts by weight of the silicone oil.

When pentaerythritol is employed as an additional mechanical stabilizing additive in the compositions of the present invention, it is found that the combination of both the boron compound and the pentaerythritol provide improved mechanical stability over the compositions from which the pentaerythritol is omitted. When pentaerythritol is employed in these compositions, the boron compound is still employed in the amounts described above and the pentaerythritol is employed in an amount up to about 5 parts, and preferably equal to from about 0.25 to 4 parts by weight per part of the boron in the boron compound.

The following examples are illustrative of the practice of my invention and are not intended for purposes of limitation. All parts are by weight.

EXAMPLE 1

A control was prepared by blending 50 parts of finely divided silica aerogel (Santocel C) and 500 parts of a silicone oil on a three-roll paint mill to give a grease. The silicone oil was a trimethylsilyl chain-stopped dimethylpolysiloxane having a viscosity of about 350 centistokes when measured at 25° C. An additional group of grease compositions were prepared by mixing 10 parts of the silica aerogel with 100 parts of the aforementioned silicone oil and a sufficient amount of various boron compounds to provide 0.05 part boron per 100 parts of the silicone oil. This mixture was blended into a grease on a three-roll paint mill. In Table I below are listed the various boron compounds employed as additives, the worked penetration of each grease as determined by ASTM D217–52T after 24 hours of room temperature storage and after 24 hours at 200° C.

*Table 1*

| Additive | Penetration | |
|---|---|---|
| | Room Temp. Storage | 200° C. Storage |
| None (Control) | 285 | |
| Trimethoxyboroxine | 253 | 245 |
| Boric Acid | 267 | 255 |
| Trimethyl Borate | 261 | 245 |
| Triethyl Borate | 270 | 265 |
| Tripropyl Borate | 285 | 270 |
| Tributyl Borate | 293 | 274 |
| Triamyl Borate | 303 | 285 |
| Tridecyl Borate | 318 | 328 |
| Triphenyl Borate | 326 | 340 |
| Nonyl Boric Acid | 337 | 355 |

No 200° C. storage penetration value is shown for the control, since the control was soupy after being worked. In contrast to this, the grease compositions containing trimethoxyboroxine, boric acid, trimethyl borate, triethyl borate, tripropyl borate, tributyl borate and triamyl borate were far superior to the control since the elevated temperature aging had little effect on the penetration values. In contrast to this, additives outside of the scope of the present invention such as tridecyl borate, triphenyl borate, and nonyl boric acid, while being more stable than the control, were still far inferior to the grease compositions containing the additives within the scope of the present invention.

EXAMPLE 2

A control was prepared by mixing 10 parts of silica aerogel and 90 parts of the silicone oil employed in Example 1. For purposes of this example, this control is designated as Compound A. Compound B was prepared by mixing 10 parts of the silica aerogel, 90 parts of the silicone oil and 1.8 parts of trimethyl borate (0.18 part boron). This mixture was milled to a grease on a three-roll paint mill. Compound C is identical to Compound B except that 1.2 parts of boric acid (0.19 part boron) were added instead of trimethyl borate. Compound D was the same as Compound B except that 0.9 part of a monobutyl ether of a mixed polyethylene-polypropylene glycol having a viscosity of 248 centistokes at 100° F. were added instead of the trimethyl borate. This glycol ether is conventionally known as a stabilizer for grease formulations. Each of Compounds A, B, C and D were allowed to stand at room temperature for 48 hours, at which time the worked penetrations were measured. In addition, the power factor, dielectric constant and volume resistivity of each of these compounds was measured. One portion of each of these compounds was heated for 30 hours in a 200° C. oven and after cooling, the worked penetrations were measured. Table II below presents the worked penetrations before and after heat aging and percent change in worked penetration. In addition, Table II lists the power factor, the dielectric constant and the volume resistivity in ohm centimeters for each of these compounds.

Table II

| Compound | A | B | C | D |
|---|---|---|---|---|
| Penetration Before Heat Aging | 281 | 237 | 248 | 272 |
| Penetration After Heat Aging | | 248 | 248 | 370 |
| Power Factor, percent | 3.0+ | 0.93 | 0.55 | 1.5 |
| Dielectric Constant | 3.01 | 2.85 | 2.82 | 2.95 |
| Volume Resistivity | $7.3 \times 10^{11}$ | $3.15 \times 10^{13}$ | $1.2 \times 10^{14}$ | $5.1 \times 10^{12}$ |

As is seen from the data in Table II, the percent change in penetration after aging for Compounds B and C which are within the scope of the present invention, are in the range of from 0 to 5%. In contrast, the percent change in penetration after aging for the control was over 42%. Compound D which contained the glycol ether additive exhibited a penetration change of only 36% indicating thermal stability. The data also show the low power factors of Compounds B and C within the scope of the present invention as compared with the relatively high power factors of Compounds A and D. The data also show that the dielectric constant of Compounds B and C within the scope of the present invention are lower than the dielectric constants of Compounds A or D. The data also show that the volume resistivity of Compounds B and C within the scope of the present invention is desirably higher than the volume resistivities of Compounds A or Compounds D.

EXAMPLE 3

This example illustrates the preparation of the boron compound treated fillers of the present invention and the formation of silicone grease compositions from these treated fillers. In addition, the example illustrates the heat treatment of a composition prepared by blending the ingredients of the composition, milling the blend into a grease, and heat treating the resulting grease. A control, identified as Compound E, was prepared by mixing 90 parts of the silicone oil of Example 1, and 10 parts of a silica aerogel and milling the ingredients into a grease. A second composition, identified as Compound F, was prepared by mixing 90 parts of the silicone oil, 10 parts of the silica aerogel and 0.75 part of trimethoxyboroxine (0.135 part boron) and blending the ingredients on a paint mill to form a grease. A third composition, identified as Compound C, was prepared by heating a portion of Compound F for three hours at 175° C. A fourth composition, identified as Compound H, was prepared by mixing 10 parts of silica aerogel with 0.75 part of trimethoxyboroxine (0.135 part boron) and heating the mixture of silica and boron compound at a temperature of 200° C. for 5 hours. This boron compound treated silica was then added to 90 parts of the silicone oil and the resulting mixture was blended into a grease. In Table III below are presented worked penetration data for each of these four compositions after storage at room temperature for 24 hours and after storage in an oven at 200° C. for 24 hours.

Table III

| Compound | E | F | G | H |
|---|---|---|---|---|
| Room Temperature Storage | 295 | 275 | 259 | 260 |
| Oven Storage | | 256 | 250 | 252 |

EXAMPLE 4

This example illustrates the effect of boron concentration in the grease compositions of the present invention. Three grease compositions were prepared from 90 parts of the methyl silicone oil of Exmaple 1, 10 parts of finely divided silica areogel and various amounts of boron added as trimethoxyboroxine. In each case, the formulations were prepared by mixing the three ingredients and subsequently blending the mixtures on a conventional three-roll paint mill. After standing at room temperature for 24 hours, the worked penetrations of each of the compositions were measured and after aging for 24 hours at 200° C., the work penetrations were measured again. As shown in Table IV below by the penetration data, all three of these grease formulations exhibited satisfactory thermal stability.

Table IV

| Percent Boron, Based on Silicone Oil Weight | 0.1 | 0.2 | 0.3 |
|---|---|---|---|
| Penetration: | | | |
| Room Temperature Storage | 265 | 271 | 276 |
| Oven Storage | 246 | 247 | 249 |

EXAMPLE 5

This example illustrates the use of a mixture of silicone oils, a mixture of silica thickening agents and a mixture of boron compounds in the preparation of the compositions of the present invention. In addition, this example illustrates the effect of pentaerythritol as a stability additive in the compositions of the present invention. The silicone oil employed in this example was a blend of 50 parts of a trimethylsilyl chain-stopped dimethylpolysiloxane oil having a viscosity of 1,000 centistokes at 25° C. and another trimethylsilyl chain-stopped dimethylpolysiloxane having a viscosity of 100 centistokes at 25° C. The grease compositions of this example were prepared by mixing the silicone oils, a silica aerogel, a fumed silica, trimethoxyboroxine, boric acid and in some cases pentaerythritol in the parts shown in Table V below. After each of these compositions were mixed, each composition was blended on a paint mill and the worked penetration after room temperature storage and after oven storage at 200° C. for 24 hours was measured. In addition, the percent evaporation of each of the silicone greases was determined by measuring the percent weight loss upon heating the composition at a temperature of 200° C. for 24 hours. In Table V below are listed the penetrations and the percent evaporation.

Table V

| Compound | I | J | K | L | M |
|---|---|---|---|---|---|
| Silicone Oil | 899 | 896 | 894 | 889 | 879 |
| Aerogel | 76 | 76 | 76 | 76 | 76 |
| Fumed Silica | 19 | 19 | 19 | 19 | 19 |
| Trimethoxyboroxine | 3.0 | 3.0 | 3.0 | 3.0 | 3.0 |
| Boric Acid | 3.0 | 3.0 | 3.0 | 3.0 | 3.0 |
| Pentaerythritol | 0 | 2.5 | 5.0 | 10.0 | 20 |
| Penetration: | | | | | |
| Room Temp. Storage | 274 | 257 | 249 | 245 | 233 |
| Oven Storage | 288 | 279 | 257 | 244 | 234 |
| Evaporation, percent | 2.13 | 1.79 | 1.48 | 1.20 | 2.58 |

As is shown by Table V, up to a certain point the addition of pentaerythritol to the grease compositions improves its thermal stability by reducing the percent evaporation.

EXAMPLE 6

This example illustrates the use of a mixture of finely divided silicas including an octamethylcyclotetrasiloxane-treated silica in the preparation of a grease composition within the scope of the present invention. The octamethylcyclotetrasiloxane treated filler was prepared by heating a mixture of 47.7 parts of fumed silica with 9.5 parts of octamethylcyclotetrasiloxane for 72 hours at 250° C. A mixture was prepared from 88 parts of the silicone oil blend of Example 5, 5.6 parts of silica aerogel, 1.7 parts of untreated fumed silica, 2.2 parts of the octamethylcyclotetrasiloxane treated fumed silica, 0.75 part of pentaerythritol and 0.75 part of trimethoxyboroxine. This mixture was heated at a temperature of 175° C. for 3 hours and after cooling the mixture was blended into a grease on a three-roll paint mill. This grease had worked penetrations after 24 hours at room temperature of 255 and after 24 hours at 200° C. of 237. In addition to the satisfactory thermal stability, this grease exhibited superior water leach resistance as compared to greases which did not contain the octamethylcyclotetrasiloxane-treated silica thickening agent.

EXAMPLE VII

This example illustrates a silicone grease in which the silicone oil is a methylchlorophenyl silicone oil. More particularly, the silicone oil contained an average of 2.22 methyl groups per silicon atom and 0.03 chlorophenyl groups per silicon atom with each phenyl group containing an average of about 4 chlorine atoms. This oil had a viscosity of about 70 centistokes at 25° C. The grease composition was prepared by mixing 86.6 parts of the methylchlorophenyl silicone oil, 6.0 parts of silica aerogel, 1.5 parts of fumed silica, 3.0 parts of the octamethylcyclotetrasiloxane-treated silica described in Example 6, 1.0 part of trimethoxyboroxine and 1.0 part of pentaerythritol. This formulation was divided into two equal parts and to one of the equal parts was added 0.5 part of a monobutylether of a mixed polyethylenepolypropylene glycol having a viscosity of 248 centistokes at 100° F. Each of these formulations were heated at 100° C. for about 4 hours at which time the mixtures were allowed to cool and were milled into a grease on a paint mill. The Table VI below presents the worked penetrations after 24 hours of room temperature storage and after 24 hours of oven storage at a temperature of 200° C. for each of these formulations. The formulation free of the polyethylene glycol ether is designated as Compound J and the grease containing the glycol ether is designated as Compound K in the table. As is shown in the table, both greases are satisfactory.

Table VI

| Compound | J | K |
|---|---|---|
| Penetration: | | |
| Room Temperature Storage | 265 | 255 |
| Oven Storage | 246 | 250 |

While the foregoing examples have illustrated many of the embodiments of the present invention, it should be understood that my invention relates broadly to a stabilized silicone grease composition comprising a major portion of a silicone oil, a finely divided silica thickening agent for such silicone oil and a minor amount of a boron compound selected from the class consisting of boric acid, trimethoxyboroxine, and trialkyl borates in which the alkyl radicals contain from 1 to 5 carbon atoms. In the preferred embodiment of my invention, the grease compositions comprise from 5 to 17 parts of the finely divided silica thickener and from 0.001 to 1 part by weight boron (as one of the aforementioned boron compounds) per 100 parts by weight silicone oil.

The grease compositions of the present invention are useful in the same applications for which prior art silica thickened silicone greases are employed but the greases of the present invention offer the advantage of added thermal stability and the advantage of improved electrical properties over prior art greases.

What I claim as new and desire to secure by Letters Patent of the United States is:

1. A stabilized grease composition comprising (1) a major portion of a silicone oil, (2) a finely divided silica as a thickener, and (3) a boron compound selected from the class consisting of boric acid, trimethoxy boroxine, and a trialkyl borate in which the alkyl radicals contain from one to five carbon atoms, said boron compound being present in an amount sufficient to provide from about 0.001 to 1.0 part by weight boron per 100 parts of said silicone oil.

2. The composition of claim 1 in which the boron compound is trimethoxyboroxine.

3. The composition of claim 1 in which the boron compound is a trialkyl borate and in which the alkyl radicals contain from one to five carbon atoms.

4. A grease composition comprising (1) a major proportion of a silicone oil, (2) a mixture of finely divided silicas as a thickening agent, and (3) a boron compound selected from the class consisting of boric acid, trimethoxyboroxine, and trialkyl borates in which the alkyl radicals contain from one to five carbon atoms, said boron compound being present in an amount sufficient to provide from about 0.001 to 1.0 part by weight boron per 100 parts of said silicone oil.

5. The composition of claim 4 in which the mixture of silicas includes from about 10 to 40 percent by weight, based on the weight of said mixture of silicas, of a finely divided silica containing a surface coating of octamethylcyclotetrasiloxane.

6. A grease composition comprising (1) a major portion of a silicone oil, (2) a finely divided silica as a thickening agent, (3) pentaerythritol and (4) a boron compound selected from class consisting of boric acid, trimethoxyboroxine, and a trialkyl borate in which the alkyl radicals contain from one to five carbon atoms, said boron compound being present in an amount sufficient to provide from about 0.001 to 1.0 part by weight boron per 100 parts of said silicone oil and said pentaerythritol being present in an amount equal to from about 0.25 to 5 parts by weight per part of boron in said boron compound.

7. The composition of claim 6 in which the boron compound is trimethoxyboroxine.

8. A treated silica comprising from about 5 to 17 parts by weight of a finely divided silica which has been mixed with from about 0.001 to 1.0 part of a boron compound selected from the class consisting of boric acid, trimethoxyboroxine, and a trialkyl borate in which the alkyl radicals contain from one to five carbon atoms.

9. A grease thickener comprising from about 5 to 17 parts by weight of a finely divided silica which has been mixed with from about 0.001 to 1.0 part of trimethoxyboroxine.

10. A process of preparing a stabilized grease composition which comprises (A) mixing (1) a major portion of a silicone oil, (2) a finely divided silica as thickening agent, and (3) a boron compound selected from the class consisting of boric acid, trimethoxyboroxine, and a trialkyl borate in which the alkyl radical contains from one to five carbon atoms, said boron compound being present in an amount sufficient to provide from about 0.001 to 1.0 part by weight boron per 100 parts of said silicone oil, and (B) milling the mixture of ingredients formed in (A) to form a grease.

11. A process of preparing a stabilized grease composition which comprises (A) forming a mixture of (1) a major proportion of a silicone oil, (2) a finely divided silica as a thickening agent and (3) a boron compound selected from the class consisting of boric acid, trimethoxyboroxine and a trialkyl borate in which the alkyl radicals contain from one to five carbon atoms, said boron compound being present in an amount sufficient to provide from about 0.001 to 1.0 part by weight boron per 100 parts of said silicone oil, (B) heating the mixture formed in (A) at a temperature of from 100° C. to 250° C. for a time in excess of one hour and (C) blending the product of (B) into a grease.

12. The process of preparing a treated silica which comprises heating from about 5 to 17 parts by weight of a finely divided silica for a time in excess of one hour at a temperature of from 100° C. to 250° C. in admixture with from about 0.001 to 1.0 part of a boron compound selected from the class consisting of boric acid, trimethoxyboroxine, and a trialkyl borate in which the alkyl radicals contain from one to five carbon atoms.

13. The process of preparing a stabilized grease composition which comprises (A) heating from about 5 to 17 parts by weight of a finely divided silica at a temperature of from 100 to 250° C. for at least one hour in admixture with from about 0.001 to 1.0 part of a boron compound selected from the class consisting of boric acid, trimethoxyboroxine, and a trialkyl borate in which the alkyl radicals contain from one to five carbon atoms, (B) mixing the product of (A) into a silicone oil in an amount sufficient to thicken said silicone oil and (C) milling the mixture of (B) to form a grease.

References Cited in the file of this patent
UNITED STATES PATENTS

| | | |
|---|---|---|
| 2,375,998 | McGregor et al. | May 15, 1945 |
| 2,428,608 | Bass | Oct. 7, 1947 |
| 2,756,212 | Hotten | July 24, 1956 |
| 2,870,108 | Nickerson | Jan. 20, 1959 |

FOREIGN PATENTS

| | | |
|---|---|---|
| 578,779 | Canada | June 30, 1959 |